United States Patent [19]
Parrish et al.

[11] Patent Number: 4,749,556
[45] Date of Patent: Jun. 7, 1988

[54] PROCESS FOR PRODUCING BORON NITRIDE

[75] Inventors: Lien N. Parrish; Charles C. Chase, both of Middleburg Heights, Ohio

[73] Assignee: Union Carbide Corporation, Danbury, Conn.

[21] Appl. No.: 804,548

[22] Filed: Dec. 4, 1985

[51] Int. Cl.$^4$ ..................... C01B 21/064; C01B 31/36
[52] U.S. Cl. .................................. 423/290; 423/291; 501/96
[58] Field of Search ................... 423/290, 291; 501/96

[56] References Cited
U.S. PATENT DOCUMENTS

| | | | |
|---|---|---|---|
| 2,865,715 | 12/1958 | Kamlet | 423/290 |
| 3,208,824 | 9/1965 | Lipp | 423/290 |
| 3,232,703 | 5/1965 | Kuhn | 423/396 |
| 3,415,625 | 12/1968 | Dabl et al. | 423/290 |
| 3,429,722 | 2/1969 | Economy et al. | 501/96 |
| 4,130,631 | 12/1978 | Hamilton | 423/290 |
| 4,562,050 | 12/1985 | Koeda et al. | 423/290 |

FOREIGN PATENT DOCUMENTS

| | | |
|---|---|---|
| 675630 | 12/1963 | Canada . |
| 1087578 | 8/1960 | Fed. Rep. of Germany ...... 423/290 |
| 874165 | 8/1961 | United Kingdom . |
| 874166 | 8/1961 | United Kingdom . |
| 1241206 | 8/1971 | United Kingdom . |

*Primary Examiner*—John Doll
*Assistant Examiner*—Lori S. Freeman
*Attorney, Agent, or Firm*—James L. Sonntag

[57] ABSTRACT

A process for producing boron nitride which comprises providing a nitrogen-containing nitride promoter, preferably melamine or dicyandiamide, in contact with an admixture of boron oxide and a sufficient amount of boric acid to enhance the formation of boron nitride under a non-oxidizing atmosphere, and maintaining same at sufficiently elevated temperature to form boron nitride.

24 Claims, No Drawings

PROCESS FOR PRODUCING BORON NITRIDE

This invention relates to a process for producing boron nitride using particulate boron oxide as a reactant material and more particularly to a continuous process for producing boron nitride from boron oxide.

BACKGROUND OF THE INVENTION

Boron nitride is a thermally stable, highly refractory material of increasing commercial significance. Typically, boron nitride is produced by processes wherein boric acid is utilized as the boron source of reaction compositions. Suggested processes for producing boron nitride from boric acid are described in U.S. Pat. Nos. 2,922,699, 3,241,918, and 3,261,667 as well as in British Pat. Nos. 874,166, 874,165, and 1,241,206.

Processes wherein boron nitride is generated from boron oxide, as opposed to boric acid, are of special interest since per unit weight of reactant materials boron oxide contains more boron than boric acid, the additional boron theoretically making higher product yields of boron nitride possible. However, processes wherein boron oxide is a reactant are generally complicated, cumbersome procedures. For example:

U.S. Pat. No. 3,208,824 discloses a process for producing boron nitride using as a boron source compounds such as $B_2O_3$, $H_3BO_3$, and alkali and alkaline earth metal borates. The process involves mixing a selected boron-containing compound and an inert solid diluent with water to form a pasty mass, extruding the pasty mass into small particles, drying the particles at a sufficiently high temperature to vaporize the water, and nitriding the dried particles with ammonia.

U.S. Pat. No. 3,232,706 discloses a process wherein boron oxide is introduced into the high temperature reaction zone of an arc furnace, vaporized and reacted with a reactive nitrogenous gas such as ammonia to produce boron nitride. The process requires the use of a specialized high temperature furnace wherein a high temperature reaction zone is produced by utilizing one or more non-consumable electrodes to generate a high temperature arc.

U.S. Pat. No. 3,429,722 discloses a process for producing boron nitride fibers wherein a boron oxide fiber having a maximum diameter of about 30 microns is heated at a temperature rise between 25°° C. per hour and 5,000° C. per hour up to a final temperature between 300° C. and 1500° C. in a current of ammonia. The patent discloses that particle size is critical to obtaining substantially complete conversion of $B_2O_3$ to born nitride (column 2, line 72 to column 3, line 11). U.S. Pat. No. 3,429,722 further discloses that by heating the oxide in ammonia, the boron oxide fiber is provided with a protective shield of a nitrogen and hydrogen containing compound which retains the fibrous form of the $B_2O_3$ reactant and prevents fusion of the fiber.

U.S. Pat. No. 4,130,631 discloses a process for forming a shaped article of fused boron nitride fibers which comprises forming a shaped article from a blend of boron oxide fibers and boric acid, heating the article in an anyhydrous gas to a temperature above the melting temperature of the boric acid for a time sufficient to melt some of the boric acid to the boron oxide fibers and, either simultaneously with or subsequent thereto, heating the article in an ammonia atmosphere to convert the boron oxide and boric acid to boron nitride. U.S. Pat. No. 4,130,631 requires that the article be heated in such a manner that the boron oxide fibers are not destroyed by melting or decomposition.

It is further known that boron oxide may be reacted with ammonia in the presence of a tertiary calcium phosphate carrier at temperatures of about 900° C. to produce boron nitride. (See *Gmelin's Handbuch der anorganischen Chemie*, supplement to 8th edition, vol. 13, part 1, pages 1-6 (Springer Verlag, 1974) as cited in U.S. Pat. No. 4,107,276). In this process the tertiary calcium phosphate carrier distributes the boron oxide in a thin sheet, providing a larger surface for oxide reaction with ammonia thereby reducing the tendency of boron oxide to form large unreactive lumps or agglomerations. However, such a reaction requires the use of extremely pure reactants and employs various heating, drying, homogenation and filtration steps.

In general, the above described processes are time-consuming, multi-step procedures, which produce commercially unattractive yields of boron nitride, require the use of boron oxide in fibrous form or utilize highly specialized equipment. Moreover, the processes typically require the use of an ammonia nitriding atmosphere, which for environmental and toxicological reasons is oftentimes objectionable.

Accordingly, it is an aspect of this invention to provide a simplified, high-yield process for producing boron nitride directly from particulate boron oxide. It is a further aspect of this invention to produce boron nitride by a process wherein nitrogen may be substituted for ammonia as a nitriding agent.

SUMMARY OF THE INVENTION

This invention is directed to a process for producing boron nitride which comprises providing a nitrogen-containing nitride promoter in contact with an admixture of boron oxide and a sufficient amount of boric acid to enhance the formation of boron nitride under a non-oxidizing atmosphere, preferably a nitrogenous atmosphere of ammonia or, most preferably, nitrogen, and maintaining same at sufficiently elevated temperature, preferably about 700° C. to about 1200° C., most preferably about 900° C. to about 1050° C., to form boron nitride.

DETAILED DESCRIPTION OF THE INVENTION

The process of this invention provides a method of producing high purity boron nitride from particulate boron oxide in relatively high yields. Further, this invention eliminates the need for time consuming reactant drying steps, and is adaptable to the continuous production of boron nitride.

For purposes of this invention an admixture of boron oxide and boric acid may be produced by heating boron oxide in the presence of at least one puffing agent capable of reacting with said boron oxide when heated to expand same, producing thereby a porous substrate comprising an homogenous mixture of boron oxide and metaboric acid. In the practice of this invention a nitrogen containing nitride promoter may be combined with boron oxide and at least one puffing agent to provide a reaction composition which is thereafter heated as previously described to produce boron nitride.

Puffing agents include compounds such as water, metaboric acid, orthoboric acid, pyroboric acid, ammonium pentaborate tetrahydrate and mixtures thereof. When water is used as a puffing agent it should be combined with the other reactants in a manner such as to avoid agglomeration of the reactant materials; e.g. spraying water onto a mixture of boron oxide and a nitride promoter. Preferred puffing agents are compounds such as metaboric acid, orthoboric acid, pyroboric acid and ammonium pentaborate tetrahydrate which increase the overall efficiency of the process by providing the reaction composition with additional boron beyond that which is provided thereto by the boron oxide reactant. For purposes of this invention, orthoboric acid and ammonium pentaborate tetrahydrate are particularly preferred puffing agents.

Boron oxide particles having a broad range of sizes are suitable for use herein. In order to sufficiently increase the surface area of the oxide available for reaction it is generally desirable to employ particles less than about 30μ in diameter, preferably about 10μ in effective diameter.

Nitrogen-containing nitride promoters contemplated for use herein include organic primary, secondary and tertiary amines, including compounds such as diphenylamine, ethylene amine, hexamethylene amine, and melamine; and organic amides such as dicyandiamide. Preferred amines are those compounds which under reaction conditions undergo polymerization to form straight chain linkages thereby optimizing the nitrogen sites available for reaction. It should be noted that under the conditions described herein, melamine typically forms a volatile polymerization by-product which tends to collect on furnace walls necessitating periodic system clean-out. Dicyandiamide does not form such a by-product and is, therefore, particularly preferred as a promoter.

The reaction compositions of this invention are subject to wide variation. In general, compositions suitable for use herein comprise from about 30 to about 55 weight percent, based upon the total weight of the reactant materials, of promoter and from about 45 to about 70 weight percent, based upon the total weight of the reactant materials, of a combination of boron oxide and puffing agent wherein the weight ratio of boron oxide to puffing agent in the combination ranges from about 4:1 to about 1:3. At concentrations above about 55 weight percent, based upon the total weight of reactant materials, nitride promoters can produce undesirably high quantities of carbon, resulting in a product of less than desirable purity. At promoter concentrations below about 40 weight percent, based upon the total weight of reactant materials, nitride production can be significantly reduced. Similarly, when a puffing agent is present in a composition in greater quantities than are suggested by the above recited weight percent and oxide to puffing agent weight ratio ranges, nitride yields can be reduced. Conversely, if the puffing agent is present in a composition in lower quantities than are suggested by the above recited weight percent and weight ratio ranges, incomplete reaction can occur as a result of the formation of a glassy boron oxide/boron nitride composite.

Preferred composition ranges depend upon the reactant components selected. When malamine, boron oxide, and boric acid are the components, particularly good product yields are obtained from a reaction composition comprising from about 45 to about 50 weight percent, based on the total weight of the reaction composition, of melamine and from about 50 to about 55 weight percent, based on the total weight of the reaction composition, of a combination of boron oxide and orthoboric acid, wherein the weight ratio of boron oxide to orthoboric acid ranges from about 3:1 to about 4:1, preferably from about 3.2:1.0 to about 3.6:1.0. In contrast thereto, when dicyandiamide, boron oxide and orthoboric acid are the components, particularly good product yields are obtained from a reaction composition comprising from about 35 to about 40 weight percent, based on the total weight of the reaction composition, of dicyandiamide and from about 60 to about 65 weight percent, based on the total weight of the reaction composition, of a combination of boron oxide and orthoboric acid, wherein the weight ratio of boron oxide to orthoboric acid ranges from about 2:1 to about 1:1, preferably from about 1.4:1.0 to about 1.0:1.0.

It is contemplated that when malamine, boron oxide and ammonium pentaborate tetrahydrate are the reaction components, particularly high yields are obtained from a reaction composition comprising from about 30 to about 40 weight percent, based on the total weight of the reaction composition, of melamine and from about 60 to about 70 weight percent, based on the total weight of the reaction composition, of a combination of boron oxide and ammonium pentaborate tetrahydrate, wherein the weight ratio of boron oxide to ammonium pentaborate tetrahydrate ranges from about 1:1 to about 1:2, preferably from about 1.0:1.2 to about 1.0:1.4. It is further contemplated that when dicyandiamide, boron oxide, and ammonium pentaborate tetrahydrate from the reaction composition, good nitride yields are obtained utilizing a reaction composition comprising from about 40 to about 50 weight percent, based on the total weight of the reaction composition, of dicyandiamide and from about 50 to about 60 weight percent, based on the total weight of the reaction composition, of a combination of boron oxide and ammonium pentaborate tetrahydrate, wherein the weight ratio of boron oxide to ammonium pentaborate tetrahydrate ranges from about 2:1 to about 3:1, preferably from about 2.3:1.0 to about 2.5:1.0.

It should be noted that while the specific composition ranges provided above generally result in relatively high product yields, acceptable nitride yields may also be obtained from compositions which fall outside of these preferred ranges (as an illustration thereof see Example 9). It is postulated that proportional variations in reaction compositions affect the amount and rate of intermediate by-product production (e.g. ammonia, water, metaboric acid and the like) which in turn affect the mechanism by which the reaction proceeds. The relationship between proportional variations in the reaction composition and nitride yield vis a vis the production of intermediate by-products is not, however, fully understood.

The preferred process of this invention may be more particularly described as comprising the steps of:

(a) mixing boron oxide; a puffing agent, preferably a puffing agent selected from the group consisting of metaboric acid, orthoboric acid, pyroboric acid, ammonium pentaborate tetrahydrate, and mixtures thereof, most preferably boric acid or ammonium pentaborate tetrahydrate; and a nitrogen-containing nitride promoter, preferably melamine or dicyandiamide to form a reaction composition;

(b) introducing the reaction composition into a reaction zone maintained at temperature in a range of from about 700° C. to about 1200° C. under a non-oxidizing atmosphere, preferably under a nitrogeneous atmosphere, most preferably under a nitrogen atmosphere.

(c) reacting the reaction composition in the reaction zone to produce amorphous boron nitride; and (d) removing the amorphous boron nitride produced from the reaction zone.

The reaction zone may be maintained at a pressure of from about −2 psi to about +10 psi and typically is maintained at a pressure from about −1 psi to about 5 psi. The time required to convert the boron-containing reactants to amorphous boron nitride is subject to wide variation depending in part upon the temperature of the reaction zone. In general, an inverse relationship exists between reaction times and temperatures, with reactions run at higher temperatures requiring shorter reaction times than reactions run at lower temperatures. Typically, reaction times vary between about 15 minutes and about 1 hour. Although temperature within the reaction zone is subject to variation, it is particularly desirable that the reaction be maintained at temperature of at least 850° C. for a period of at least 15 minutes in order to ensure that all reaction generated gases and residual carbon impurities are removed from the reaction product.

Following nitride formation the product formed may be cooled to temperature of less than about 50° C., crushed to a particle size of less than about 25 mm, preferably about 10 mm, and heated to a second higher temperature of about 1300° C. to about 2000° C., in a non-oxidizing atmosphere, preferably a nitrogenous atmosphere (e.g. ammonia or nitrogen) or, more preferably in a nitrogen atmosphere, to crystallize the amorphous boron nitride produced by the first heating. The resultant product may thereafter be washed, preferably with a solvent such as methanol or a 1% aqueous solution of nitric acid, to produce a fine, white, high purity, crystalline boron nitride powder.

The process of this invention may be carried out batch-wise or continuously. In continuous production processes the amorphous boron nitride produced following heating to a first elevated temperature, preferably between about 700° C. and about 1200° C., is directly introduced into a second higher temperature zone of about 1300° C. to about 2000° C.; maintained in the said second higher temperature zone under a non-oxidizing atmosphere, preferably a nitrogenous atmosphere, most preferably a nitrogen atmosphere, for a period of time sufficient to ensure essentially complete nitridation, typically from about 45 minutes to about 2 hours; and then crushed and washed as discussed above to yield a high purity crystalline product.

Preferably, the process of this invention achieves a Conversion Efficiency of at least 40%, preferably at least 50% and most preferably at least 55%. For purposes of this invention Conversion Efficiency is defined as:

$$100 \times \frac{\text{(grams of washed, dried BN produced after nitriding at 1400° C.)}}{\text{(grams of } B_2O_3 \text{ added as a reactant + grams of diffusing agent added as a reactant)}}$$

The following examples are provided for purposes of illustrating the process of this invention. The examples are not to be construed as limiting this invention in any manner. Examples 1 to 13 illustrate the variations in product yields and conversion efficiencies which result from the use of different reaction compositions. Examples 12 and 13 provide estimated product yields of an ammonium pentaborate tetrahydrate-containing reaction composition.

EXAMPLE 1

482 grams of melamine, 400 grams of boron oxide and 118 grams of orthoboric acid were blended together and spread onto a 12 inch×12 inch×2 inch (30.48 cm×30.48 cm×5.08 cm) graphite pan coated with an oxidation resistant ceramic paint. The pan was placed on a continuous belt and introduced to a furnace where it was heated in a 1000° C. first reaction zone for a period of 20 minutes. Heating was conducted under nitrogen gas at a pressure of 1 atmosphere (1.01 bars). Following this first heating the resultant product, an amorphous boron nitride cake, was cooled to about 50° C. and weighed. The weight of the cake was recorded as 400 grams. The cake was then crushed to a particle size of about 13 mm and heat treated at a second higher temperature of 1400° C. in a nitrogen atmosphere at a pressure of 1 atmosphere (1.01 bars) for a period of 60 minutes. Following the second higher temperature heat treatment the particles were methanol washed and dried to produce 212 grams of finely divided boron nitride powder having an analytical composition of 53.9 weight percent N, 42.4 weight percent B, 2.75 weight percent O, and 0.11 weight percent C.

EXAMPLES 2-5

The procedure followed in Example 1 was repeated using the reaction compositions specified in Table I. The product yields of the finely divided boron nitride powder produced varied between 186 and 274 grams based upon 1000 grams of starting material.

EXAMPLE 6

482 grams of melamine, 400 grams of boron oxide and 118 grams of orthoboric acid were blended together and spread onto a 12 inch×12 inch×2 inch (30.48 cm×30.48 cm×5.08 cm) graphite pan coated with an oxidation resistant ceramic paint. The pan was placed on a continuous belt and introduced to a furnace where it was heated in a 1000° C. first reaction zone for a period of 30 minutes and thereafter heated at a second higher temperature of 1400° C. for a period of 3 hours to achieve complete nitridation. Heating was conducted under nitrogen gas at a pressure of 1 atmosphere (1.01 bars). Following the second heating, the resultant product, an amorphous boron nitride cake, was crushed to a particle size of 13 mm, methanol washed and dried to produce 240 grams of finely divided boron nitride powder.

EXAMPLES 7-11

The procedure followed in Example 6 was repeated using the reaction compositions specified in Table I. The product yields of the finely divided boron nitride powder produced varied between 215 and 283 grams based upon 1000 grams of starting material.

EXAMPLE 12

344 grams of melamine, 285 grams of boron oxide and 371 grams of ammonium pentaborate tetrahydrate are blended together and spread onto a 12 inch×12 inch×2 inch (30.48 cm×30.48 cm×5.08 cm) graphite pan coated with an oxidation resistant ceramic paint. The pan is placed on a continuous belt and introduced to a furnace where it is heated in a 1000° C. first reaction zone for a period of 30 minutes and thereafter heated at a second higher temperature of 1400° C. for a period of 3 hours to achieve complete nitridation. Heating is conducted under nitrogen gas at a pressure of 1 atmosphere (1.01 bars). Following the second heating the resultant product is crushed to a particle size of 13 mm, methanol washed and dried. Based on these reactants the estimated yield of boron nitride is 372 grams.

EXAMPLE 13

534 grams of dicyandiamide, 330 grams of boron oxide and 136 grams of ammonium pentaborate tetrahydrate and blended together and spread onto a 12 inch×12 inch×2 inch (30.48 cm×30.48 cm×5.08 cm) graphite pan coated with an oxidation resistant ceramic paint. The pan is placed on a continuous belt and introduced to a furnace where it is heated in a 1000° C. temperature zone for a period of 30 minutes and thereafter heated at a second higher temperature of 1400° C. for a period of 3 hours to achieve complete nitridation. Heating is conducted under nitrogen gas at a pressure of 1 atmosphere (1.01 bars). Following the second heating the resultant product is crushed to a particle size of 13 mm, methanol washed and dried. Based on these reactants, the estimated yield of boron nitride is 341 grams.

COMPARATIVE EXAMPLE 1

541 grams of orthoboric acid was blended with 459 grams of melamine, charge into a stainless steel pan and dried at 300° C. for a period of 2 hours to form a dry cake. The cake was crushed to a particle size of about 10 mm and reacted at a temperature of 1000° C. in an ammonia atmosphere for a period of 10 minutes. Thereafter the reacted material was heated at 1400° C. under nitrogen gas at a pressure of 1 atmosphere (1.01 bars) for a period of 1 hour, acid washed with a 1% aqueous solution of nitric acid at 70° C., crushed and dried to produce 154 grams of finely divided boron nitride powder having an analytical composition of 55.0 weight percent N, 43.2 weight percent B, 3.1 weight percent O, and less than 0.1 weight percent C.

A comparison of the conversion efficiencies of Examples 1 to 6 and 9 to 11 with that of Comparative Example 1 illustrates that superior conversion efficiencies and product yields are obtainable by the processes of this invention wherein boron oxide is a reactant material.

COMPARATIVE EXAMPLE 2

500 grams of boron oxide and 500 grams of melamine were blended together and spread onto a 12 inch×12 inch×2 inch (30.48 cm×30.48 cm×5.08 cm) pan coated with an oxidation resistant ceramic paint. The pan was placed on continuous belt and introduced to a furnace where it was heated in a 1000° C. first reaction zone for a period of 30 minutes. Heating was conducted under nitrogen gas at a pressure of 1 atmosphere (1.01 bars). The resultant product was a yellowish-black material covered by a hard, thick layer of glassy boron oxide. The product was unsuitable for further processing. Comparative Example 2 illustrates that in the absence of a puffing agent, it is not feasible to produce boron nitride from boron oxide and melamine reactants.

For purposes of illustration, this invention has been described with reference to certain specific embodiments. It will be recognized by those skilled in this art that variations of these embodiments are possible without departing from the scope and spirit of this invention. It is intended that such variations, though unexemplified, be covered by this invention.

TABLE I

| Ex. ample | Melamine Reacted (g) | Dicyandiamide Reacted (g) | $B_2O_3$ Reacted (g) | $H_3BO_3$ Reacted (g) | $BN^1$ Produced (g) | Conversion Efficiency (%) |
|---|---|---|---|---|---|---|
| 1 | 482 | — | 400 | 118 | 212 | 41 |
| 2 | 482 | — | 400 | 118 | 223 | 43 |
| 3 | 482 | — | 400 | 118 | 274 | 53 |
| 4 | 497 | — | 137 | 366 | 186 | 37 |
| 5 | — | 341 | 283 | 376 | 245 | 57 |
| 6 | 482 | — | 400 | 118 | 240 | 46 |
| 7 | 385 | — | 426 | 189 | 258 | 31 |
| 8 | 556 | — | 307 | 137 | 215 | 31 |
| 9 | 532 | — | 294 | 174 | 233 | 50 |
| 10 | — | 390 | 323 | 287 | 283 | 47 |
| 11 | — | 341 | 283 | 376 | 233 | 57 |
| $C_1$ | 459 | — | — | 541 | 154 | 28 |

[1] BN produced after product is nitrided at 1400° C., washed and dried

What is claimed is:

1. A process for producing boron nitride which comprises mixing boron oxide, orthoboric acid and melamine to form a reaction composition which comprises from about 45 to about 50 weight percent, based on the weight of the reaction composition, of melamine and from about 50 to about 55 weight percent, based on the weight of the reaction composition, of a combination of boron oxide and orthoboric acid, wherein the weight ratio of boron oxide to orthoboric acid is from about 3:1 to about 4:1; and heating said composition to temperature of about 700° C. to about 1200° C. under a non-oxidizing atmosphere to form boron nitride.

2. A process for producing boron nitride which comprises mixing boron oxide, orthoboric acid and dicyandiamide to form a reaction composition which comprises from about 35 to about 40 weight percent, based on the weight of the reaction composition, of dicyandiamide and from about 60 to about 65 weight percent, based on the weight of the reaction composition, of a combination of boron oxide and orthoboric acid, wherein the weight ratio of boron oxide to boron acid is from about 2:1 to about 1:1; and heating said composition to temperature of about 700° C. to about 1200° C. under a non-oxidizing atmosphere to form boron nitride.

3. A process for producing boron nitride which comprises mixing boron oxide, ammonium pentaborate tetrahydrate and melamine to form a reaction composition which comprises from about 30 to about 40 weight percent, based on the weight of the reaction composition, of melamine and from about 60 to about 70 weight percent, based on the weight of the reaction composition, of a combination of boron oxide and ammonium pentaborate tetrahydrate, wherein the weight ratio of boron oxide to ammonium pentaborate tetrahydrate is from about 1:1 to about 1:2; and heating said composition to temperature of about 700° C. to about 1200° C. under a non-oxidizing atmosphere to form boron nitride.

4. A process for producing boron nitride which comprises combining boron oxide, ammonium pentaborate tetrahydrate and dicyandiamide to form a reaction composition which comprises from about 40 to about 50 weight percent, based on the weight of the reaction composition, of dicyandiamide and from about 50 to about 60 weight percent, based on the weight of the reaction composition, of a combination of boron oxide and ammonium pentaborate tetrahydrate wherein the weight ratio of boron oxide to ammonium pentaborate tetrahydrate is from about 2:1 to about 3:1 and heating said composition to temperature of about 700° C. to about 1200° C. under a non-oxidizing atmosphere to form boron nitride.

5. The process of claims 1, 2, 3 or 4 wherein the reaction composition is maintained at temperature of at least 850° C. for a period of at least about 15 minutes to produce boron nitride.

6. A process for producing boron nitride which comprises;
   (a) contacting a nitrogen-containing nitride promoter with an admixture of boron oxide and an amount of boric acid sufficient to enhance the formation of boron nitride under a non-oxidizing atmosphere and to provide a ratio of boron oxide to boric acid from about 4:1 to about 1:3, and
   (b) maintaining the admixture at a temperature from about 700° C. to about 1200° C. to form boron nitride.

7. The process of claim 6 wherein the boric acid is produced by reacting the boron oxide with a puffing agent at elevated temperature.

8. The process of claim 6 wherein the reaction composition comprises from about 30 to about 55 weight percent of a nitrogen-containing nitride promoter, and from about 45 to about 70 weight percent of a mixture of boron oxide and boric acid.

9. The process of claim 6 wherein the non-oxidizing atmosphere is an atmosphere of ammonia or nitrogen.

10. The process of claim 6 wherein after the reaction mixture is heated to a temperature from about 700° to about 1200° C., the resulting boron nitride product is heated at a temperature from about 1300° to about 2000° C. under an non-oxidizing atmosphere to form crystalline boron nitride.

11. The process of claim 10 wherein the heating to form crystalline boron nitride is under a nitrogenous atmosphere.

12. A process for producing boron nitride which comprises;
   (a) contacting a nitrogen-containing nitride promoter with an admixture of boron oxide and a sufficient amount of boric acid to enhance the formation of boron nitride under a non-oxidizing atmosphere, and
   (b) maintaining the admixture at a temperature from about 700° C. to about 1200° C. to form boron nitride,
wherein the admixture of boron oxide and boric acid is produced by heating the boron oxide in the presence of at least one puffing agent at a ratio of boron oxide to puffing agent of from about 4:1 to about 1:3.

13. An ammonia-free process for producing boron nitride which comprises the steps of:
   (a) mixing boron oxide, a puffing agent selected from the group consisting of water, metaboric acid, orthoboric acid, pyroboric acid, ammonium pentaborate tetrahydrate and mixtures thereof, and a nitrogen containing nitride promoter selected from the group consisting of melamine and dicyandiamide in amounts to form a reaction composition, with a weight ratio of boron oxide to puffing agent from about 4:1 to about 1:3;
   (b) introducing the reaction composition into a reaction zone maintained at temperature in a range of from about 700° C. to about 1200° C. under an atmosphere of nitrogen;
   (c) reacting the reaction composition in said reaction zone to produce amorphous boron nitride; and
   (d) removing the amorphous boron nitride from the reaction zone.

14. The process of claim 13 additionally comprising the steps of;
   (e) cooling the amorphous boron nitride formed in the reaction zone to a temperature less than 50° C.;
   (f) crushing the cooled amorphous boron nitride to a particle size of less than about 25 mm; and
   (g) nitriding the crushed particles at a temperature from about 1300° to about 2000° C. under an atmosphere of
   nitrogen to produce a crystalline product.

15. A process for producing boron nitride which comprises;
   (a) providing a reaction composition comprising from about 45 to about 70 weight percent of a mixture of boron oxide and a puffing agent with the ratio of boron oxide to puffing agent being from about 4:1 to about 1:3, and from about 30 to 55 weight percent of a nitrogen-containing nitride promoter, and
   (b) maintaining the reaction composition at a temperature from about 700° C. to about 1200° C. under a nonoxidizing atmosphere to form boron nitride.

16. The process of claim 7, 12, or 15, wherein the puffing agent is selected from the group consisting of; water, metaboric acid, orthoboric acid, pyroboric acid, ammonium pentaborate tetrahydrate and mixtures thereof.

17. The process of claim 7, 12, or 15, wherein the puffing agent is selected from the group consisting of; metaboric acid, orthoboric acid, pyroboric acid, and ammonium pentaborate tetrahydrate.

18. The process of claim 7, 12, or 15, wherein the puffing agent is selected from the group consisting of orthoboric acid, and ammonium pentaborate tetrahydrate.

19. The process of claim 7, 12, or 15, wherein the nitrogen-containing nitride promoter is selected from the group consisting of primary amines, secondary amines, tertiary amines, and amides.

20. The process of claim 7, 12 or 15, wherein the nitrogen-containing nitride promoter is selected from the group consisting of diphenylamine, ethylene amine, hexamethylene amine, and melamine and dicyandiamide.

21. The process of claim 6 wherein the reaction composition is maintained at a temperature of at least 840° C. for a period of at least about 15 minutes to produce boron nitride.

22. A process for producing boron nitride which comprises;
   (a) contacting a nitrogen-containing nitride promoter with an admixture of boron oxide and a sufficient amount of boric acid to enhance the formation of boron nitride under a non-oxidizing atmosphere, and
   (b) maintaining the admixture at a sufficiently elevated temperature to form boron nitride; wherein the ratio of boron oxide to boric acid is from about 4:1 to about 1:3.

23. The process of claim 22 wherein the boric acid is produced by reacting the boron oxide with a puffing agent at elevated temperature.

24. A process for producing boron nitride which comprises;

(a) contacting a nitrogen-containing nitride promoter with an admixture of boron oxide and a sufficient amount of boric acid to enhance the formation of boron nitride under a non-oxidizing atmosphere, and
(b) maintaining the reaction composition at a temperature to form boron nitride, wherein the admixture of boron oxide and boric acid is produced by heating boron oxide in the presence of at least one puffing agent at a ratio of boron oxide to puffing agent of from about 4:1 to about 1:3.

* * * * *